United States Patent Office 3,015,656
Patented Jan. 2, 1962

3,015,656
6 - OXYGENATED 17α - (2 - CARBOXYETHYL) - 17β-HYDROXYANDROST-4-EN-3-ONE LACTONES
Roy H. Bible, Jr., Morton Grove, Ill., assignor to G. D. Searle & Co., Chicago, Ill., a corporation of Delaware
No Drawing. Filed May 5, 1960, Ser. No. 26,960
8 Claims. (Cl. 260—239.57)

This invention relates to 6-oxygenated 17α-(2-carboxyethyl)-17β-hydroxyandrost-4-en-3-one lactones and processes for the manufacture thereof. More particularly, this invention relates to chemical compounds of the formula

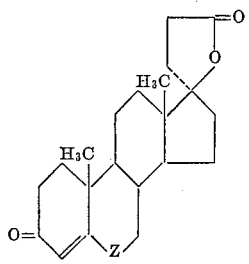

wherein Z represents a hydroxymethylene, alkanoyloxymethylene, alkoxymethylene, or carbonyl radical.

Among the alkanoyloxymethylene radicals represented by Z, especially (lower alkanoyl) oxymethylene radicals are preferred, which is to say radicals of the formula

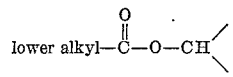

Typical of the lower alkyl groupings embraced are methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_nH_{2n+1}$ aggregates wherein $n$ represents a positive integer amounting to less than 9. The alkoxymethylene radicals represented by Z likewise are preferably of lower order, being those comprehended by the formula lower alkyl—O—CH<

The constituent hydroxy, alkanoyloxy, and alkoxy groupings attach to carbon atom 6 of the steroid nucleus in either α or β configuration, depending upon the starting materials and processes of manufacture employed.

Equivalent to the described lactones for purposes of the present invention are corresponding hydroxy acids and their alkali salts, of the formula

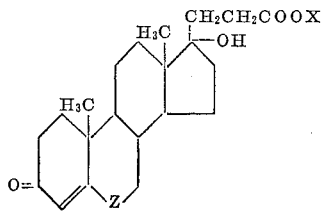

wherein Z is defined as before and X represents hydrogen, an alkali metal, or the ammonium radical. Those skilled in the art will appreciate that the salts set forth readily derive from the opposite lactones on contact with aqueous alkali. The free acids, in turn, are obtained from the salts by a critically brief exposure to a proton source; prolongation of the exposure time induces lactonization.

The compounds to which this invention relates are useful because of their valuable pharmacological properties. For example, they are potent diuretics, being adapted to block the effect of desoxycorticosterone acetate on urinary sodium and potassium.

The 3,6-diketone and the 6α-alkoxy compounds hereof are obtained by heating corresponding 4,5-dihydro-5α-hydroxy 6-ketone or 6β-alkoxides with basic aluminum hydroxide in benzene or comparable medium to split out the elements of water. Substitution of a silica-magnesia mixture for the basic aluminum hydroxide affords the 6β-alkoxides from the indicated 6β-alkoxy-4,5-dihydro-5α-hydroxy starting materials. The 6-alkanoyloxy compounds hereof are manufactured by contacting corresponding 6β-alkanoyloxy-4,5-dihydro-5α-hydroxy lactones with dry hydrogen chloride in chloroform medium at 0°, the 6α configuration being obtained if a small amount of ethanol be present, the 6β if not. Finally, the claimed 6-hydroxy lactones are prepared from the stereochemically apt 6-alkanoates hereof by saponification with absolute alcoholic potassium hydroxide in an inert atmosphere at room temperatures, configuration of the oxygenated grouping at carbon atom 6 remaining unchanged under these conditions.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter, set forth, temperatures are given in degrees centigrade and relative amounts of materials in parts by weight, except as otherwise noted.

*Example 1*

*17α - (2 - carboxyethyl)-17β-hydroxyandrost-4-ene-3,6-dione γ-lactone.*—A solution of approximately 3 parts of 17α - (2-carboxyethyl)-5α,17β-dihydroxyandrostane-3,6-dione γ-lactone [obtained from 17α-(2-carboxyethyl)-5α,6α-epoxyandrostane-3β,17β-diol γ-lactone by consecutive contact in a solvent medium with aqueous sulfuric acid and chromic acid dissolved in aqueous acetic acid as detailed in Examples 1–3 of the U. S. patent application of Roy H. Bible, filed May 5, 1960, under Serial No. 26,941] in 630 parts of benzene is heated at the boiling point under reflux during agitation for 1¼ hours with 32 parts of basic aluminum oxide [activity grade 1, Brockmann et al., Chem. Ber., 74, 73(1941)]. The mixture is then filtered hot, and the solids thus removed are successively washed with benzene and methylene chloride. Filtrate and washings are combined and stripped of solvent by vacuum distillation. The residue, recrystallized from methanol, melts at 222.5–227.5° and has a specific rotation of −61°. This material 17α-(2-carboxyethyl)-17β-hydroxyandrost-4-ene-3,6-dione γ-lactone, of the formula

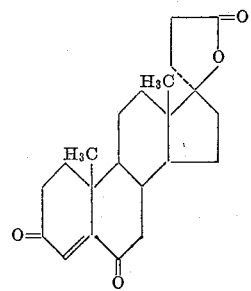

*Example 2*

*17α-(2 - carboxyethyl) - 17β - hydroxy-6β-methoxyandrost-4-en-3-one γ-lactone.*—A solution of 1 part of 17α-(2-carboxyethyl) - 5α,17β - dihydroxy-6β-methoxyandrostan-3-one γ-lactone [obtained from 17α-(2-carboxyethyl)5α,6α-epoxyandrostane-3β,17β-diol γ-lactone by consecutive contact with methanolic sulfuric acid and acetonic chromic acid dissolved in aqueous acetic acid as detailed in Examples 4–5 of the U.S. patent application of Roy H. Bible, filed May 5, 1960, under Serial No. 26,941] in 180 parts of benzene is heated at the boiling point under reflux during agitation for 5½ hours with 10 parts of a 100/200 mesh mixture of silica (85%) and magnesia (15%). The mixture is then filtered hot, and the solids thus removed are washed with benzene. Filtrate and washings are combined and stripped of solvent by vacuum distillation. The residue is 17α-(2-carboxyethyl)-17β-hydroxy-6β-methoxyandrost-4-en-3-one γ-lactone, of the formula

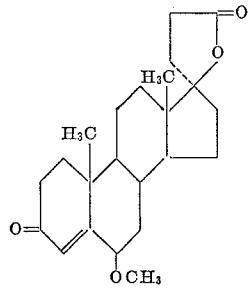

*Example 3*

6β-acetoxy-17α-(2 - carboxyethyl)-17β-hydroxyandrost-4-en-3-one γ-lactone.—A solution of 80 parts of 6β-acetoxy 17α-(2-carboxyethyl)-5α,17β-dihydroxyandrostan-3-one γ-lactone [obtained from 17α-(2-carboxyethyl)-5α,6α-epoxyandrostane-3β,17β-diol γ-lactone by consecutive contact with acetonic aqueous sulfuric acid, pyridine and acetic anhydride complex, methanolic aqueous sodium hydroxide, and acetonic chromic acid dissolved in aqueous sulfuric acid as detailed in Examples 1, 7, and 9–10 of the U.S. patent application of Roy H. Bible, filed May 5, 1960, under Serial No. 26,941] in 300 parts of dry redistilled chloroform is maintained at 0° in contact with a slow stream of dry hydrogen chloride for 3 hours, then washed successively with water, aqueous 5% sodium bicarbonate, and finally water again. The solution is thereupon dried over anhydrous sodium sulfate and stripped of solvent by vacuum distillation. The residue is 6β-acetoxy-17α-(2 - carboxyethyl)-17β-hydroxyandrost-4-en-3-one γ-lactone, of the formula

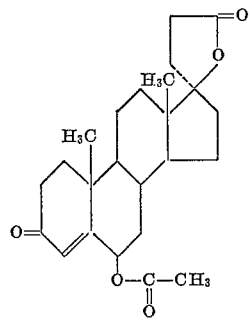

*Example 4*

17α-(2-carboxyethyl)-6β,17β - dihydroxyandrost-4-en-3-one γ-lactone.—Approximately 400 parts of 6β-acetoxy-17α-(2-carboxyethyl) - 17β - hydroxyandrost-4-en-3-one γ-lactone is dissolved in a solution of 73 parts of potassium hydroxide in 6400 parts of absolute ethanol under a nitrogen atmosphere. The resultant solution is maintained under nitrogen at room temperatures for 2 hours, then acidified with glacial acetic acid and concentrated in vacuo to roughly ½₀th of its original volume. Upon dilution with water, the desired 17α-(2-carboxyethyl)- 6β,17β-dihydroxyandrost-4-en-3-one γ-lactone is precipitated. The product has the formula

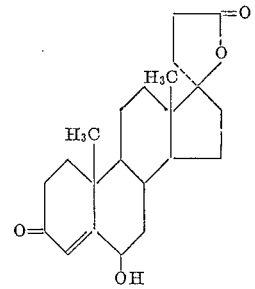

*Example 5*

17α-(2-carboxyethyl) - 17β - hydroxy - 6α - methoxyandrost-4-en-3-one γ-lactone.—A solution of 5 parts of 17α-(2-carboxyethyl) - 5α,17β - dihydroxy-6β-methoxyandrostan-3-one γ-lactone in 1800 parts of benzene is heated at the boiling point under reflux in a nitrogen atmosphere during agitation for 15 minutes with 50 parts of basic aluminum oxide [activity grade 1, Brockmann et al., Chem. Ber., 74, 73 (1941)]. The mixture is then filtered hot, and the solids thus removed are washed with benzene. Filtrate and washings are combined and stripped of solvent by distillation. The residue, upon recrystallization from methanol, melts at 249–253.5° and has a specific rotation of +14°. This material is 17α-(2-carboxyethyl)-17β-hydroxy-6α-methoxyandrost-4-en-3-one γ-lactone, of the formula

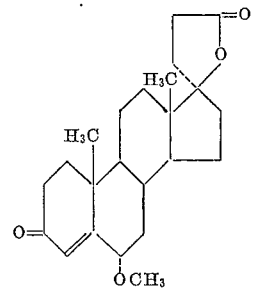

*Example 6*

6α-acetoxy-17α-(2-carboxyethyl) - 17β-hydroxyandrost-4-en-3-one γ-lactone.—A solution of 80 parts of 6β-acetoxy-17α-(2-carboxyethyl)-5α,17β - dihydroxyandrostan-3-one γ-lactone in 300 parts of dry redistilled chloroform containing 1 part of ethanol is maintained at 0° for 3 hours in contact with a slow stream of dry hydrogen chloride. The solution is then successively washed with water, aqueous 5% sodium bicarbonate, and water again, whereupon it is dried over anhydrous sodium sulfate. Evaporation of solvent affords as the residue, 6α-acetoxy-17α-(2-carboxyethyl) - 17β - hydroxyandrost-4-en-3-one γ-lactone, of the formula

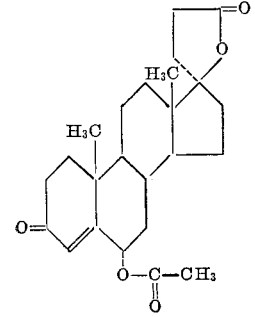

Example 7

*17α - (2 - carboxyethyl) - 6α,17β - dihydroxyandrost-4-en-3-one γ-lactone.*—Substitution of 400 parts of 6α-acetoxy - 17α - (2 - carboxyethyl) - 17β - hydroxyandrost-4-en-3-one γ-lactone for the 6β-acetoxy-17α-(2-carboxyethyl) - 17β - hydroxyandrost - 4 - en - 3 - one γ-lactone called for in Example 4 affords, by the procedure there detailed, 17α-(2-carboxyethyl)-6α,17β-dihydroxyandrost-4-en-3-one γ-lactone, of the formula

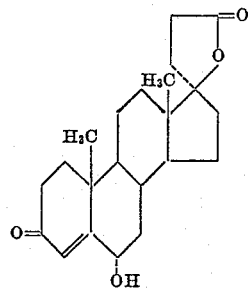

What is claimed is:
1. A compound of the formula

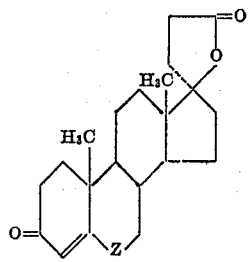

wherein Z represents a member of the class consisting of carbonyl, methoxymethylene, acetoxymethylene, and hydroxymethylene radicals.

2. 17α - (2 - carboxyethyl) - 17β - hydroxyandrost-4-ene-3,6-dione γ-lactone.

3. A compound of the formula

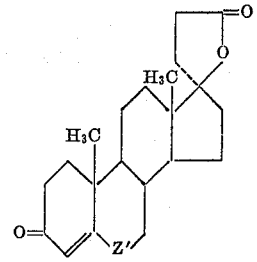

wherein Z' represents a methoxymethylene radical.

4. 17α - (2 - carboxyethyl) - 17β - hydroxy - 6α-methoxyandrost-4-en-3-one γ-lactone.

5. A compound of the formula

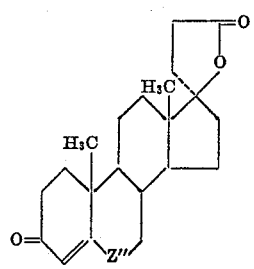

wherein Z" represents an acetoxymethylene radical.

6. 6β - acetoxy - 17α - (2 - carboxyethyl) - 17β - hydroxyandrost-4-en-3-one γ-lactone.

7. A compound of the formula

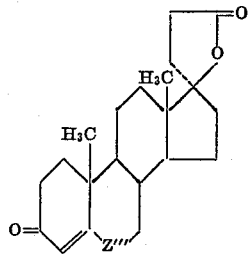

wherein Z''' represents a hydroxymethylene radical.

8. 17α - (2 - carboxyethyl) - 6α,17β - dihydroxyandrost-4-en-3-one γ-lactone.

No references cited.